US006313183B1

(12) United States Patent
Pillai et al.

(10) Patent No.: US 6,313,183 B1
(45) Date of Patent: Nov. 6, 2001

(54) PROCESS FOR PREPARING THERMOPLASTIC RUBBERS FROM VULCANIZED RUBBER SCRAP MATERIALS AND OLEFINIC PLASTIC

(76) Inventors: Chandrasekaran R. Pillai, 31299 Fairmount Blvd., Pepper Pike, Cleveland, OH (US) 44124; C. Hari Chandra, 1646 Greenwood Dr., South Bend, IN (US) 46614

( * ) Notice: Subject to any disclaimer, the term of this patent is extended or adjusted under 35 U.S.C. 154(b) by 38 days.

(21) Appl. No.: 09/616,047

(22) Filed: Jul. 13, 2000

(51) Int. Cl.⁷ .................................................. C08J 11/04
(52) U.S. Cl. .................................................. 521/41
(58) Field of Search .................................................. 521/41

(56) References Cited

U.S. PATENT DOCUMENTS 5,157,082 * 10/1992 Johnson ................................ 525/237
5,731,358 * 3/1998 Pillai ..................................... 521/41

* cited by examiner

Primary Examiner—Kriellion Sanders
(74) Attorney, Agent, or Firm—Peter A. Borsari, Esq.

(57) ABSTRACT

A process for preparing thermoplastic rubbers from vulcanized rubber scrap material is provided comprising devulcanizing the vulcanized rubber scrap material while blending the vulcanized rubber scrap material with an olefinic plastic resin in the presence of devulcanizing additives. Preferably, the vulcanized rubber scrap material is first milled prior to blending with the olefinic plastic rein. The plastic resin may be a virgin resin, a recycled resin or a mixture thereof. The process is termed "dynamic de-vulcanization" to denote that the rubber scrap material is being devulcanized while it is being blended with the plastic resin to form the thermoplastic rubber. The resultant thermoplastic rubbers exhibit superior physical properties such as tensile strength, elongation, hardness and flexural modulus compared to thermoplastic rubber compositions comprising mixtures of plastics and recycled rubbers heretofore produced. In one embodiment, the thermoplastic rubbers are prepared from blends of vulcanized and virgin rubber materials and recycled and virgin plastic resins.

17 Claims, No Drawings

PROCESS FOR PREPARING THERMOPLASTIC RUBBERS FROM VULCANIZED RUBBER SCRAP MATERIALS AND OLEFINIC PLASTIC

FIELD OF INVENTION

The present invention relates to a process for preparing thermoplastic rubbers from vulcanized rubber scrap materials and olefinic plastic resins. The process comprises a preliminary treatment of the vulcanized rubber scrap materials with an epoxidized natural rubber and stearic acid or a zinc salt thereof. The resulting mixture is blended with one or more olefinic plastic resins in the presence of at least one devulcanizing additive in order to obtain a high quality thermoplastic rubber material.

BACKGROUND OF THE INVENTION

The co-inventor of the present invention previously has developed a process for the manufacture of high grade devulcanized rubbers as disclosed in U.S. Pat. No. 5,731,358. This earlier process has been produced on a commercial scale to make devulcanized rubber for use in the manufacture of automotive molded parts. The resulting products using this devulcanized rubber have improved physical characteristics over previous recycled rubber products. In addition, the manufacturing costs associated with producing these products have been reduced significantly.

During the course of designing specific formulations for certain types of seals using the devulcanized rubbers of the prior process, it was found that thermoplastic rubbers are more commonly used in the manufacture of seals than the conventional rubbers. In view of this finding, various compositions comprising a mixture of thermoplastics and recycled rubbers were developed, tried and tested using a similar processing technique to that which was used in the devulcanization process of U.S. Pat. No. 5,731,358. At the same time, improvements to the process were developed to modify the processing temperatures and the sequence of incorporating various reagents and additives to the main components. These improvements resulted in a unique phenomenon of changes in flow characteristics relating to the rubber viscosity. This phenomenon is the progressive change in viscosity which first drops and then increases during the course of blending the rubber composite with the plastic resin at elevated temperatures in the presence of a select group of chemicals and additives. This phenomenon is termed "dynamic de-vulcanization", which refers to the devulcanization of the vulcanized rubber scrap material while blending with a thermoplastic resin. Thus, the present invention can be considered an improvement and extension of the process disclosed in the previous U.S. Pat. No. 5,731,358, as well as further efforts by the present inventors to address the disposal problems of rubbers scraps, most of which are now sent to landfills with the prospects of serious environmental consequences to the soil and ground water.

U.S. Pat. No. 4,130,535 to Coran et al. discloses the preparation of "Thermoplastic Vulcanizates" (TPV) from ground powders of completely vulcanized rubber blended with polypropylene and polyethylene. In Coran et al., TPV compositions are based on virgin rubbers that first are vulcanized, and virgin olefinic resins. In contrast, the present invention uses a devulcanized rubber component based on post industrial rejects and post consumer scraps, the devulcanization of the rubber being accomplished in a single stage. A similar thermoplastic rubber composition and the method of its manufacture is described in U.S. Pat. No. 3,758,643 to W. K. Fisher. Fisher's method and material differs from the present invention in that the Fisher process also uses virgin rubber as a starting material which is "dynamically" vulcanized first and then blended with a plastic resin.

U.S. Pat. Nos. 5,191,005 to and 5,856,399 to (both assigned to Misui Corporation) teach processes and compositions for preparing a thermoplastic elastomer based on a blend of olefinic plastics and two polymers, one of which is cross-linkable by peroxide and the other of which is not. The Misui patents differ from the present invention in that they also use virgin rubbers as the starting material, rather than used and recycled rubber scraps. In addition, neither patent discloses the "dynamic de-vulcanization" technique of the present invention. In U.S. Pat. No. 5,597,867 to Tsujimoto et al., a composition comprising a partially cross-linkable rubber portion of a rubber/plastic blend with an organosiloxane. As with the other patents, Tsujimoto et al. also uses virgin rubber and does not use a dynamic de-vulcanization technique. U.S. Pat. No. 5,934,558 to Kim et al. discloses compositions comprising styrenic polymer, chlorinated ethylene, a modified ethylene-propylenic rubber and a grafted vinyl copolymer. Kim et al. does not use a recycled rubber and requires the use of additional starting materials in the blend.

U.S. Pat. No. 5.157,082 to Lane D. Johnson describes a process using vulcanized scraps, including used tires, which first are finely ground and then blended with thermoplastic resins to produce extremely hard composites with Hardness indices ranging from Shore D levels of 35 to 45. Johnson also describes a process for adding SEBS copolymers to reduce the hardness level to about Shore A 60. The Johnson process differs from the present invention in that (a) the vulcanized scraps have to be finely ground, and (b) the subsequent mixing process is a straight blending without "devulcanization" of the scrap vulcanized rubber which is evident from lower physical properties, in particular the tensile strength of Johnson's samples from the embodiments. The dynamic devulcanization in the present invention contributes to greatly enhanced tensile strength at any given hardness level, and other desirable attributes described in later sections of this application. Two prior patents teach the use of recycled rubbers in the preparation of thermoplastic rubber compositions. Specifically, U.S. Pat. No. 5,733,943 to Doan discloses a process and composition for the manufacture of a street sign material using reground rubber from used tires in a blend with a styrene-butadiene copolymer and polypropylene or polyethylene mixed in a heated extruder to produce the final product. In U.S. Pat. No. 6,015,861 to Mertzel et al., a composition comprising finely ground cross-linked rubber with a compatibilizer and thermoplastic material is prepared by a simple mixing technique using an extruder or other form of mixer. Both Doan and Mertzel et al. differ from the present invention in that neither subjects the used ground rubber component to devulcanization. In the present invention, it has been found that the use of a devulcanized used rubber greatly increases the interfacial adhesion between the rubber component and the thermoplastic component, thereby resulting in improved overall physical properties, and in particular the tensile strength, of the final product.

None of the prior art processes and compositions discussed above disclose or teach a process using "dynamically de-vulcanized" vulcanized rubber derived from recycled rubbers which have been prepared through a milling technique, rather than being ground into a fine powder without devulcanization. Thus, a need still exists for a process for the manufacture of thermoplastic rubbers from vulcanized rubber scrap materials and olefinic plastic resins in the presence of at least one devulcanizing additive. In addition, such a process should utilize particular devulcanizing additives which promote interfacial adhesion between the thermoplastic component and the rubber component. Moreover, such a process should improve the physical properties and surface finish of the resulting products relative to products obtained from the prior art methods.

SUMMARY OF THE INVENTION

Accordingly, it is an object of the present invention to provide a process for the manufacture of thermoplastic rubber compositions derived from post consumer and post-industrial vulcanized scrap rubbers and virgin or recycled olefinic plastic resins.

It is another object of the present invention to provide a thermoplastic rubber composition derived from post consumer and post-industrial vulcanized scrap rubbers and virgin or recycled olefinic plastic resins which can be used in the manufacture of high quality products for various applications ranging from injection molded seals to extrusions for "scratch strips" on automobiles and boats.

It also is an object of the present invention to provide a process for the manufacture of high quality thermoplastic rubber compositions derived from vulcanized scrap rubbers and virgin or recycled olefinic plastic resins which reduces manufacturing costs.

It is a further object of the present invention to provide a process for the manufacture of high quality thermoplastic rubber compositions derived from vulcanized scrap rubbers and olefinic plastic resins which produces a versatile reusable material which can be a substitute for rubber and plastic raw materials in the manufacture of rubber/plastic articles.

It is yet another object of the present invention to provide a process for the manufacture of high quality thermoplastic rubber compositions derived from vulcanized scrap rubbers and virgin or recycled olefinic plastic resins which promotes interfacial adhesion between the thermoplastic component and the rubber component.

It is an additional object of the present invention to provide a process for the manufacture of high quality thermoplastic rubbers from vulcanized scrap rubbers and olefinic plastic resins which enable the manufacturer to vary the Hardness, Elasticity, Flexural Modulus and Set properties of the products as demonstrated by stiffness, elongation at break, flexibility and ability to recover shape on deformation after the deforming force is removed, by varying the rubber component with a mixture of devulcanized scrap rubber and virgin rubber compound.

It also is an object of the present invention to provide a process for the manufacture of high quality thermoplastic rubber compositions derived from vulcanized scrap rubbers and olefinic plastic resins which enables the manufacturer to vary the flexibility and hardness characteristics of the final thermal rubber product within closely predictable levels as demonstrated by Flexural Modulus and Hardness indexes by varying the types and ratios of the plastic component in the composition.

It is an additional object of the present invention to provide a process for the manufacture of high quality thermoplastic rubbers from vulcanized scrap rubbers and olefinic plastic resins which enables the manufacturer to vary the hardness, elasticity and set properties of the final products as demonstrated by Shore A hardness index, elongation at break percentage in tensile strength and compression set by varying the plasticizer in the virgin rubber component in the mixture of devulcanized scrap rubber.

Additional objects, advantages and novel features of the invention will be set forth in part of the description which follows, and in part will become apparent to those skilled in the art upon examination of the following specification or may be learned by practice of the invention.

These and other objects of the present invention are achieved by providing a "dynamic de-vulcanization" process for the production of a high quality thermoplastic rubber composition comprising a preliminary treatment of the vulcanized rubber scrap material on a two roll mill followed by blending the treated mixture with an olefinic plastic resin and particular devulcanizing additives in an internal mixer in predetermined ratios at elevated temperatures for a predetermined time until the mix is homogenous as determined by the load on the motor of the internal mixer.

DETAILED DESCRIPTION

The present invention relates to a process for the production of thermoplastic rubber compositions derived from vulcanized scrap rubbers blended with an olefinic plastic resin, and more particularly to a "dynamic de-vulcanization" process. The term "dynamic de-vulcanization" refers to a process in which the devulcanization of vulcanized scrap rubber is accomplished during the mixing with one or more plastic resins at elevated temperatures in the presence of particular devulcanizing additives. Included among the types of vulcanized scrap rubber materials contemplated for use in the present invention are those derived from Natural Rubber, ethylene propylene terpolymer (EPDM), EPM copolymer, Styrene Butadiene Rubber, Polybutadiene Rubber and Nitrile Rubber. Suitable types of scrap rubber sources include, for example, (1) rubber scraps and rejected rubber parts generated from tire manufacturing processes, such scraps constituting mostly styrene butadiene rubber, polybutadiene rubber and natural rubber, (2) rubber scraps generated from automobile parts molding processes, such as molding flashes and rejected rubber parts, such scraps constituting EPDM Rubber, (3) rubber scraps generated from extrusion processes in the manufacture of automobile windscreens and window seals, such as start up rejects, blemished portions and rejected lengths, such scraps constituting EPDM rubber, (4) rubber scraps generated from calendaring processes in the manufacture of EPDM Roofing Membranes, such as torn sections, blemished and short run rejects, and (5) rubber scraps generated in the manufacturing processes of natural rubber latex gloves. Moreover, rubber scrap materials recovered from used articles that are discarded after use, conventionally termed "post consumer rejects", including, for example, (1) used passenger tires which are ground into fine powders and composed mostly of Styrene Butadiene Rubber, (2) used truck tires ground into powders, most of which is composed of natural rubber and to a lesser smaller degree, polybutadiene rubber, (3) rubber automobile parts obtained from Vehicle Recovery Programs (such as Ford Motor Company's Vehicle Recycling Program) which are segregated into EPDM based parts of windscreens and window seals, and (4) natural rubber latex gloves used in electronic assembly lines and gathered after use for disposal. Suitable types of plastic resin components contemplated for use in the present invention are polypropylene copolymers (PP), polyethylene, low density polyethylene (LDPE) and high density polyethylene (HDPE), and recycled plastic resins of these materials, such as polypropylene derived from recycling processes in the recovery of used battery cases. However, it is to be understood that the types of rubbers and plastic resins disclosed herein are meant to be illustrative only and that scrap rubbers and recycled plastics derived from other sources may be used in the instant invention.

The process of the present invention comprises a preliminary treatment of the vulcanized scrap rubber material followed by a blending of the treated vulcanized scrap rubber material with an olefinic plastic resin. In both the preliminary treatment and blending operations, at least one additive to promote the devulcanization of the vulcanized scrap rubber material. The preliminary treatment is conducted on a two-roll miller while the blending is conducted in an internal mixture. Both operations are continued until a homogenous mixture is obtained. The ratio of the vulcanized rubber scrap material and at least one devulcanizing additive varies according to the desired melt flow properties of the final thermoplastic rubber product. In some instances, the addition of a virgin rubber-based compound of similar composition to that of the vulcanized scrap rubber may be added to the mix when it is desired to modify specific properties of the resulting thermoplastic rubber.

In the preliminary treatment step, a base mixture is formed by milling together the vulcanized scrap rubber material with epoxidized natural rubber and stearic acid or a zinc salt thereof on a rubber two-roll refiner mill with a friction ratio of the rolls running at about 1:1.8 to about 1:2.5. In order to minimize the strain on the mill and reduce the mixing time, the vulcanized scrap rubbers, if initially obtained in long strips and/or odd shapes, are first granulated or shredded into chips of about ½ inch diameter or less. The chips first are milled alone for a time sufficient for them to breakdown and form a loose band on the rolls. Then, epoxidized natural rubber, stearic acid or zinc stearate are added to the mill. The amount of epoxidized natural rubber varies from about 2.0 to about 7.5 parts/weight (based on the 100 parts of the scrap rubber component) depending upon the type of vulcanized scrap rubber used as the starting material. From about 1.0 to about 6.0 parts/weight (based on the 100 parts of the scrap rubber component) of stearic acid is added to the mixture at the end of the treatment step in order to soften the mixture prior to transferring the base mixture from the mill. The amount of stearic acid is dependent upon the hardness of vulcanized scrap rubber and the type of vulcanized scrap rubber used as a starting material. Zinc stearate may be substituted for the stearic acid.

The resulting mixture (hereinafter sometimes referred to as the "base mixture") is transferred to an internal mixer or Banbury mixer which is fitted with a dump extruder and pelletizing facilities common in conventional plastic processing lines. An olefinic plastic resin is added to the mixer in a ratio ranging from about 50 parts to about 85 parts of the base mixture to about 50 parts to 15 parts of the olefinic plastic resin to form a rubber/resin mixture. The volume or fill factor of the rubber/resin mixture in the internal mixer should preferably be within 80 to 85% of the chamber capacity. The rotor speed of the internal mixer is selected to be in the range of about 30 to about 80 rpm; preferably the internal mixer is provided with a variable speed motor to control the speed. Additionally, the internal mixer should have heating/cooling system to maintain the temperature within a certain range. The starting temperature of the mixer should be between about 200 and 250° F.

The devulcanizing additives are added together with the treated rubber base mix resulting from the milling process, to an internal mixer at the beginning of the mixing operation. More particularly, from about 1.0 to about 5.0 parts of zinc oxide, from about 1.0 to about 8.0 parts of ethylene vinyl acetate copolymer, and from about 0.2 to about 2.0 parts of a rubber accelerator compound (e.g. peptizer), all parts being based on 100 parts of the total scrap rubber component, are added to facilitate the "dynamic de-vulcanization". Preferred rubber accelerator compounds include dibenzothiozole disulphide, diphenyl guanidine and mixtures thereof. Preferably, from 0.2 to about 1.0 parts of dibenzothiozole disulphide and from about 0.2 to about 1.0 parts of diphenyl guanadine are added to the treated rubber mix along with the other devulcanizing additives. If about 3.0 to about 5.0 parts of zinc stearate was used in the preliminary step, the zinc oxide may be omitted from the mixer. Of course, it is to be understood that the exact amount of each of these devulcanizing additives is dependent upon the type of vulcanized rubber scrap material used, as well as the type of any olefinic plastic scrap material.

During the mixing process, the temperature of the mixture rises due to friction. The mixing process should continue at about 50 to about 80 rpm, preferably at about 60 rpm, until the temperature reaches about 350° F., then the speed of the mixer should be reduced to about 30 rpm for about one (1) to about (2) minutes. If there is no variable speed motor, then the temperature of the chamber should be maintained at 350° F. for the one (1) to two (2) minute mixing period, particularly if natural rubber based scrap or used tire rubber scrap is the vulcanized rubber scrap material component of the mix. Careful monitoring of the temperature is important, as any runaway temperature will "burn" the rubber and reduce the physical properties of the thermoplastic rubber, as well as create a residual odor. The mixing process typically takes about 4 to about 10 minutes depending on the type of rubber in the scrap rubber component of the mix and the time it takes for the temperature to rise. The resulting thermoplastic rubber mixture then is transferred directly into a dump extruder which extrudes the final composition into a water trough that leads to a jet air blower to remove surface moisture and then to a rotary pelletizer (cutter).

The following examples are provided merely to illustrate the present invention, and it is to be understood that the invention is not limited thereto. All amounts of the various ingredients in the examples and elsewhere in the specification are by weight unless otherwise specified. In each of the examples, one or more rubber scrap material is used as the rubber component. Relevant information regarding each rubber scrap material is provided hereinbelow.

SC-1: EPMD Roofing Membrane is scrap rubber arising from the manufacturing process of EPDM (ethylene-propylene terpolymer rubber) roof membrane having the following composition:

| Component | Parts |
| --- | --- |
| EPDM Rubber (Grade: Du Pont's Nordel 1070) | 100.00 |
| Zinc Oxide | 5.00 |
| Parafinic Process Oil | 80.00 |
| N 650 Carbon Black | 120.00 |
| Sulfur | 1.50 |
| Captax (rubber accelerator from Vanderbilt Chemicals) | 0.50 |
| Unads (Rubber Accelerator from Vanderbilt Chemicals) | 1.50 |

SC-2: EPDM Automobile Scraps is a scrap rubber derived from automobile under-the-hood body plugs scraps having the following composition:

| Component | Parts |
|---|---|
| EPDM Rubber (Grade: Du Pont's Nordel 2744) | 100.00 |
| Zinc Oxide | 3.00 |
| Stearic Acid | 1.00 |
| Parafinic Process Oil | 150.00 |
| N 650 Carbon Black | 150.00 |
| Sulfur | 1.50 |
| Captax (Rubber Accelerator from Vanderbilt Chemicals) | 0.50 |
| Unads (Rubber Accelerator from Vanderbilt Chemicals) | 1.60 |

SC-3: EPMD Automobile Window and Windscreen Seals Scrap is a scrap rubber obtained from the manufacturing operations of Standard Products in Michigan having the following composition:

| Component | Parts |
|---|---|
| EPDM Rubber (Grade: Uniroyal EPDM 585) | 100.00 |
| Zinc Oxide | 5.00 |
| Stearic Acid | 1.00 |
| Parafinic Process Oil | 70.00 |
| N 650 Carbon Black | 65.00 |
| N 762 Carbon Black | 30.00 |
| Whiting | 30.00 |
| Azodicarbonamide | 6.00 |
| Butyl Zimate (Vanderbilt Chemical - Accelerator) | 1.50 |
| Sulfur | 1.50 |
| Captax (Rubber Accelerator from Vanderbilt Chemicals) | 0.50 |
| Tellurac (Rubber Accelerator from Vanderbilt Chemicals) | 0.50 |
| Thiate U | 1.00 |
| Elasto Cal 80 | 1.50 |

SC-4: Natural Rubber Truck Tire Retread Scrap is a scrap rubber having the following composition and properties:

| Component | Parts |
|---|---|
| Natural Rubber (Grade: SMR 20) | 100.00 |
| Renacit 7 (Peptiser from Bayer Chemicals) | 0.40 |
| Zinc Oxide | 5.00 |
| Stearic Acid | 2.00 |
| Aktiplast T (Bayer Chemicals: Process Aid) | 1.50 |
| Process Oil | 15.00 |
| N 220 Carbon Black | 52.00 |
| TQ (Antioxidant) | 1.50 |
| Santoflex 13 (Anti-ozonant from Monsanto Chemicals) | 0.60 |
| TBBS (Accelerator) | 1.50 |
| Sulfur | 1.50 |
| PVI (Prevulcansisation inhibitor) | 0.10 |

SC-5: Passenger Tire Crumb is a rubber scrap from post consumer scraps (used tires) from NRI Industries having the following composition:

| Components | Parts |
|---|---|
| Styrene Butadiene Rubber (Plioflex 1502 SBR) | 50.00 |
| TSR 20 Natural Rubber | 50.00 |
| Zinc Oxide | 3.00 |
| Stearic Acid | 1.00 |
| VANAWAX H Special | 1.00 |
| Aromatic Process Oil | 9.00 |
| N 229 Carbon Black | 45.00 |
| Antiozite 67P (Antioxidant/Antiozonant) | 1.00 |
| VANAX DPG | 0.40 |
| AMAX (Accelerator) | 0.80 |
| Sulfur | 1.60 |

SC-6: Natural Rubber Latex Glove Scraps is a rubber scrap from the manufacture of gloves by Ansell, Inc. having the following composition:

| Component | Parts |
|---|---|
| Natural Rubber Latex (Dry Rubber Content 60%) | 167.00 |
| Zinc Oxide 40% Dispersion | 10.00 |
| Oleic Acid 20% Emulsion | 10.00 |
| Aktiplast T (Bayer Chemicals: Process Aid) | 1.50 |
| Non staining Antioxidant 40% Dispersion | 5.00 |
| Titanium Dioxide 40% Dispersion | 10.00 |
| ZDC 40% Dispersion (Accelerator) | 2.50 |
| Sulfur 40% Dispersion | 2.50 |

EXAMPLE 1

Thermoplastic Rubber from EPMD Roofing Scrap Membrane and Polypropylene

In the preliminary treatment step, a base mix composition was prepared on a refiner mill by mixing the following components for about ten (10) minutes until they were homogenous.

| | |
|---|---|
| EPDM Roofing Membrane Scrap (SC-1) | 60.00 parts |
| Epoxidised Natural rubber[1] | 1.80 parts |
| Stearic Acid | 0.70 parts |

[1]Epoxiprene, a cis 1,4 polyisoprene with epoxide groups randomly dispersed along the polymer backbone, manufactured by Kumpulan Guthrie Berhad of Malaysia as Epoxyprene 25 and Epoxyprene 50, indicating 25% and 50% epoxidation.

[1]Epoxiprene, a cis 1,4 polyisoperene with epoxide groups randomly dispersed along the polymer backbone, manufactured by Kumpulan Guthrie Berhad of Malaysia as Epoxyprene 25 and Epoxyprene 50, indicating 25% and 50% epoxidation.

In the final step, the thermoplastic rubber composition was formed from the following components in a variable speed internal mixer having an initial temperature of 250° F.

| | |
|---|---|
| Base mix composition from preliminary step | 62.50 parts |
| Virgin Polypropylene[2] | 40.00 parts |
| Zinc Oxide | 3.00 parts |
| Diphenyl Guanadine | 0.25 parts |
| Dibenzothiozole disulphide | 0.50 parts |
| Ethylene Vinyl Acetate copolymer[3] | 3.00 parts |

[2]Polypropylene manufactured by Exxon Chemical Company as Escorene PD 7414.
[3]Ethylene Vinyl Acetate copolymer manufactured by AT Plastics, Inc., having 40% vinyl content.

[2]Polypropylene manufactured by Exxon Chemical Company as Escorene PD 7414.
[3]Ethylene Vinyl Acetate copolymer manufactured by AT Plastics, Inc., having 40% vinyl content.

The components were mixed for about four (4) minutes at 60 rpm as the temperature increased to 350° F. and the mixing continued for an additional two minutes at 30 rpm. The resulting mixture was transferred to a dump mill, cooled and granulated.

EXAMPLE 2

The thermoplastic Rubber from EPDM Roofing Scrap Membrane and Polyethylene

In the preliminary treatment step, a base mix composition was prepared on a refiner mill by mixing the following components for about ten (10) minutes until they were homogenous.

| | |
|---|---|
| EPDM Roofing Membrane Scrap (SC-1) | 60.00 parts |
| Epoxidised Natural rubber | 1.80 parts |
| Stearic Acid | 0.70 parts |

In the final step, the thermoplastic rubber composition was formed from the following components in a variable speed internal mixer having an initial temperature of 250° F.

| | |
|---|---|
| Base mix composition from preliminary step | 62.50 parts |
| Virgin Polyethylene[4] | 40.00 parts |
| Zinc Oxide | 3.00 parts |
| Diphenyl Guanadine | 0.25 parts |
| Dibenzothiozole disulphide | 0.50 parts |
| Ethylene Vinyl Acetate copolymer | 3.00 parts |

[4]Polyethylene manufactured by Dow Chemical U.S.A. as LDPE-4005M

[4]Polyethylene manufactured by Dow Chemical U.S.A. as LDPE 4005M

The components were mixed for about four (4) minutes at 60 rpm as the temperature increased to 350° F. and the mixing continued for an additional two minutes at 30 rpm. The resulting mixture was transferred to a dump mill, cooled and granulated.

EXAMPLE 3

Thermoplastic Rubber from EPDM Auto and Polypropylene

In the preliminary treatment step, a base mix composition was prepared on a refiner mill by mixing the following components for about ten (10) minutes until they were homogenous.

| | |
|---|---|
| EPDM Auto under hood body plug Scrap (SC-2) | 60.00 parts |
| Epoxidised Natural rubber | 1.80 parts |
| Stearic Acid | 0.70 parts |

In the final step, the thermoplastic rubber composition was formed from the following components in a variable speed internal mixer having an initial temperature of 250° F.

| | |
|---|---|
| Base mix composition from preliminary step | 62.50 parts |
| Virgin Polypropylene | 40.00 parts |
| Zinc Oxide | 3.00 parts |
| Diphenyl Guanadine | 0.25 parts |
| Dibenzothiozole disulphide | 0.50 parts |
| Ethylene Vinyl Acetate copolymer | 3.00 parts |

The components were mixed for about four (4) minutes at 60 rpm as the temperature increased to 350° F. and the mixing continued for an additional two minutes at 30 rpm. The resulting mixture was transferred to a dump mill, cooled and granulated.

EXAMPLE 4

Thermoplastic Rubber from Vulcanized EPDM Auto Scraps and Polyethylene

In the preliminary treatment step, a base mix composition was prepared on a refiner mill by mixing the following components for about ten (10) minutes until they were homogenous.

| | |
|---|---|
| EPDM Auto under hood body plug Scrap (SC-2) | 60.00 parts |
| Epoxidised Natural rubber | 1.80 parts |
| Stearic Acid | 0.70 parts |

In the final step, the thermoplastic rubber composition was formed from the following components in a variable speed internal mixer having an initial temperature of 250° F.

| | |
|---|---|
| Base mix composition from preliminary step | 62.50 parts |
| Virgin Polyethylene | 40.00 parts |
| Zinc Oxide | 3.00 parts |
| Diphenyl Guanadine | 0.25 parts |
| Dibenzothiozole disulphide | 0.50 parts |
| Ethylene Vinyl Acetate copolymer | 3.00 parts |

The components were mixed for about four (4) minutes at 60 rpm as the temperature increased to 350° F. and the mixing continued for an additional two minutes at 30 rpm. The resulting mixture was transferred to a dump mill, cooled and granulated.

EXAMPLE 5

Thermoplastic Rubber from Vulcanized EPDM Auto Scrap and Polypropylene

In the preliminary treatment step, a base mix composition was prepared on a refiner mill by mixing the following components for about ten (10) minutes until they were homogenous.

| | |
|---|---|
| EPDM Auto under hood body plug (SC-2) | 50.00 parts |
| Plasticizer (Parafinic Oil Based) | 40.00 parts |
| Epoxidised Natural rubber | 1.80 parts |
| Stearic Acid | 0.70 parts |

In the final step, the thermoplastic rubber composition was formed from the following components in a variable speed internal mixer having an initial temperature of 250° F.

| | |
|---|---|
| Base mix composition from preliminary step | 92.50 parts |
| Virgin Polypropylene | 10.00 parts |
| Zinc Oxide | 3.00 parts |
| Diphenyl Guanadine | 0.25 parts |
| Dibenzothiozole disulphide | 0.50 parts |
| Ethylene Vinyl Acetate copolymer | 3.00 parts |

The components were mixed for about four (4) minutes at 60 rpm as the temperature increased to 350° F. and the mixing continued for an additional two minutes at 30 rpm. The resulting mixture was transferred to a dump mill, cooled and granulated.

EXAMPLE 6

Thermoplastic Rubber from EPDM Auto Scraps, EPDM Roofing Membrane Scraps and Polupropylene In the preliminary treatment step, a base mix composition was prepared on a refiner mill by mixing the following components for about ten (10) minutes until they were homogenous.

| | |
|---|---|
| EPDM Auto under hood body plug Scrap (SC-2) | 35.00 parts |
| EPDM Roofing Membrane Scrap—Ref. (SC-1) | 15.00 parts |
| Plasticizer (Parafinic Oil Based) | 20.00 parts |
| Epoxidised Natural rubber | 1.80 parts |
| Stearic Acid | 0.70 parts |

In the final step, the thermoplastic rubber composition was formed from the following components in a variable speed internal mixer having an initial temperature of 250° F.

| | |
|---|---|
| Base mix composition from preliminary step | 72.5 parts |
| Virgin Polypropylene | 30.00 parts |
| Zinc Oxide | 3.00 parts |
| Diphenyl Guanadine | 0.25 parts |
| Dibenzothiozole disulphide | 0.50 parts |
| Ethylene Vinyl Acetate copolymer | 3.00 parts |

The components were mixed for about four (4) minutes at 60 rpm as the temperature increased to 350° F. and the mixing continued for an additional two minutes at 30 rpm. The resulting mixture was transferred to a dump mill, cooled and granulated.

EXAMPLE 7

Thermoplastic Rubber from EPDM Auto Scraps and Polypropylene

In the preliminary treatment step, a base mix composition was prepared on a refiner mill by mixing the following components for about ten (10) minutes until they were homogenous.

| | |
|---|---|
| EPDM auto window and windscreen seals scrap (SC-3) | 60.00 parts |
| Epoxidised Natural rubber | 1.80 parts |
| Stearic Acid | 0.70 parts |

In the final step, the thermoplastic rubber composition was formed from the following components in a variable speed internal mixer having an initial temperature of 250° F.

| | |
|---|---|
| Base mix composition from preliminary step | 62.50 parts |
| Virgin Polypropylene | 40.00 parts |
| Zinc Oxide | 3.00 parts |
| Diphenyl Guanadine | 0.25 parts |
| Dibenzothiozole disulphide | 0.50 parts |
| Ethylene Vinyl Acetate copolymer | 3.00 parts |

The components were mixed for about four (4) minutes at 60 rpm as the temperature increased to 350° F. and the mixing continued for an additional two minutes at 30 rpm. The resulting mixture was transferred to a dump mill, cooled and granulated.

EXAMPLE 8

Thermoplastic Rubber from EPDM Auto Scraps, Virgin EPDM Compound and Recycled Polypropylene In the preliminary treatment step, a base mix composition was prepared on a refiner mill by mixing the following components for about ten (10) minutes until they were homogenous.

| | |
|---|---|
| EPDM auto window and windscreen seal scrap (SC-3) | 50.00 parts |
| Virgin EPDM Compound[5] | 20.00 parts |
| Epoxidised Natural rubber | 1.80 parts |
| Stearic Acid | 0.70 parts |

[5]EPDM 7 parts, Oil 6 parts, N650 black 6 parts

[5]EPDM 7 parts, Oil 6 parts, N650 black 6 parts

In the final step, the thermoplastic rubber composition was formed from the following components in a variable speed internal mixer having an initial temperature of 250° F.

| | |
|---|---|
| Base mix composition from preliminary step | 72.50 parts |
| Recycled Polypropylene[6] | 30.00 parts |
| Zinc Oxide | 3.00 parts |
| Diphenyl Guanadine | 0.25 parts |
| Dibenzothiozole disulphide | 0.50 parts |
| Ethylene Vinyl Acetate copolymer | 3.00 parts |

[6]Recycled-Polypropylene manufactured by KW Plastics of Bloomfield Hills, MI from used battery cases

[6]Recycled-Polypropylene manufactured by KW Plastics of Bloomfield Hills, Mich. from used battery cases The components were mixed for about four (4) minutes at 60 rpm as the temperature increased to 350° F. and the mixing continued for an additional two minutes at 30 rpm. The resulting mixture was transferred to a dump mill, cooled and granulated.

EXAMPLE 9

Thermoplastic Rubber from Tire Retread Scraps, Natural Rubber Compound and Polypropylene In the preliminary treatment step, a base mix composition was prepared on a refiner mill by mixing the following components for about ten (10) minutes until they were homogenous.

| | |
|---|---|
| Truck Tire Retread Scrap (SC-4) | 45.00 parts |
| Natural Rubber Compound[7] | 15.00 parts |
| Epoxidised Natural rubber | 1.80 parts |
| Stearic Acid | 0.70 parts |

[7]Natural Rubber 10, N 220 Black 5

In the final step, the thermoplastic rubber composition was formed from the following components in a variable speed internal mixer having an initial temperature of 250° F.

| | |
|---|---|
| Base mix composition from preliminary step | 62.50 parts |
| Virgin Polypropylene | 40.00 parts |
| Zinc Oxide | 3.00 parts |
| Diphenyl Guanadine | 0.25 parts |

| | |
|---|---|
| Dibenzothiozole disulphide | 0.50 parts |
| Ethylene Vinyl Acetate copolymer | 3.00 parts |

The components were mixed for about four (4) minutes at 60 rpm as the temperature increased to 350° F. and the mixing continued for an additional two minutes at 30 rpm. The resulting mixture was transferred to a dump mill, cooled and granulated.

EXAMPLE 10

Thermoplastic Rubber from Passenger Tire Crumb, Natural Latex Glove Rubber Rejuvenate and Polypropylene In the preliminary treatment step, a base mix composition was prepared on a refiner mill by mixing the following components for about ten (10) minutes until they were homogenous.

| | |
|---|---|
| Passenger Tire Crumb (SC-5) | 45.00 parts |
| Natural Latex Glove Rubber Rejuvenate | 15.00 parts |
| Epoxidised Natural rubber | 1.80 parts |
| Stearic Acid | 0.70 parts |

In the final step, the thermoplastic rubber composition was formed from the following components in a variable speed internal mixer having an initial temperature of 250° F.

| | |
|---|---|
| Base mix composition from preliminary step | 62.50 parts |
| Virgin Polypropylene | 40.00 parts |
| Zinc Oxide | 3.00 parts |
| Diphenyl Guanadine | 0.25 parts |
| Dibenzothiozole disulphide | 0.50 parts |
| Ethylene Vinyl Acetate copolymer | 3.00 parts |

The components were mixed for about four (4) minutes at 60 rpm as the temperature increased to 350° F. and the mixing continued for an additional two minutes at 30 rpm. The resulting mixture was transferred to a dump mill, cooled and granulated.

EXAMPLE 11

Thermoplastic Rubber from Natural Rubber Latex Glove Scrap and Polypropylene

In the preliminary treatment step, a base mix composition was prepared on a refiner mill by mixing the following components for about ten (10) minutes until they were homogenous.

| | |
|---|---|
| Natural Rubber Latex Glove Scrap (SC-6) | 60.00 parts |
| Epoxidised Natural rubber | 1.80 parts |
| Stearic Acid | 0.70 parts |

In the final step, the thermoplastic rubber composition was formed from the following components in a variable speed internal mixer having an initial temperature of 250° F.

| | |
|---|---|
| Base mix composition from preliminary step | 62.5 parts |
| Virgin Polypropylene | 40.00 parts |
| Zinc Oxide | 3.00 parts |
| Diphenyl Guanadine | 0.25 parts |
| Dibenzothiozole disulphide | 0.50 parts |
| Ethylene Vinyl Acetate copolymer | 3.00 parts |

The components were mixed for about four (4) minutes at 60 rpm as the temperature increased to 350° F. and the mixing continued for an additional two minutes at 30 rpm. The resulting mixture was transferred to a dump mill, cooled and granulated.

EXAMPLE 12

Thermoplastic Rubber from Used Passenger Tire Rubber Scrap, Virgin Natural Rubber and Recycled Polypropylene In the preliminary treatment step, a base mix composition was prepared on a refiner mill by mixing the following components for about ten (10) minutes until they were homogenous.

| | |
|---|---|
| Truck Tire Retread Scrap (SC-5) | 48.00 parts |
| Virgin Natural Rubber Compound[8] | 12.00 parts |
| Epoxidised Natural rubber | 1.80 parts |
| Stearic Acid | 0.70 parts |

[8]Natural Rubber 10, N 220 Black 5

In the final step, the thermoplastic rubber composition was formed from the following components in a variable speed internal mixer having an initial temperature of 250° F.

| | |
|---|---|
| Base mix composition from preliminary step | 62.50 parts |
| Recycled polypropylene | 40.00 parts |
| Zinc Oxide | 3.00 parts |
| Diphenyl Guanadine | 0.25 parts |
| Dibenzothiozole disulphide | 0.50 parts |
| Ethylene Vinyl Acetate copolymer | 3.00 parts |

The components were mixed for about three (3) minutes at 60 rpm as the temperature increased to 350° F. and the mixing continued for an additional three minutes at 30 rpm. The resulting mixture was transferred to a dump mill, cooled and granulated.

EXAMPLE 13

Thermoplastic Rubber from EPDM Rubber Scraps, Virgin EPDM Rubber Mix and Polypropylene In the preliminary treatment step, a base mix composition was prepared on a refiner mill by mixing the following components for about ten (10) minutes until they were homogenous.

| | |
|---|---|
| EPDM Rubber Scrap (SC-3) | 50.00 parts |
| Epoxidised Natural rubber | 3.00 parts |
| Stearic Acid | 1.00 parts |

In the final step, the thermoplastic rubber composition was formed from the following components in a variable speed internal mixer having an initial temperature of 250° F.

| Base mix composition from preliminary step | 54.00 parts |
| --- | --- |
| Virgin EPDM Rubber Mix[9] | 20.00 parts |
| Virgin Polypropylene | 30.00 parts |
| Zinc Oxide | 3.00 parts |
| Diphenyl Guanadine | 0.25 parts |
| Dibenzothiozole disulphide | 0.50 parts |
| Ethylene Vinyl Acetate copolymer | 3.00 parts |

[9]EPDM, Nordel 2744 100 parts, N 650 carbon black 150 parts, and paraffinic oil 150 parts

[9]EPDM, Nordel 2744 100 parts, N 650 carbon black 150 parts, and paraffinic oil 150 parts The components were mixed for about four (4) minutes at 60 rpm as the temperature increased to 350° F. and the mixing continued for an additional two minutes at 30 rpm. The resulting mixture was transferred to a dump mill, cooled and granulated.

Test specimens were prepared from the resulting thermoplastic rubbers of each sample by injection molding and tested in accordance with ASTM standards for physical properties and compared against several commercial grades of thermoplastic rubbers, specifically Santoprene™, manufactured by Advanced Elastomers. The results of these tests are provided in the following table.

| Thermoplastic Rubber | Tensile Strength (psi) | Elongation at Break % | Modulus at 50% Strain | Shore A Hardness Index | Flexural Modulus Mpa | Specific Gravity | Compression Set at 23° C. |
| --- | --- | --- | --- | --- | --- | --- | --- |
| Example 1 | 1660 | 170 | 1630 | 93 | 265 | 1.088 | 78 |
| Example 2 | 990 | 80 | 910 | 87 | 61 | 1.096 | 38 |
| Example 3 | 2600 | 410 | 2080 | 93 | 237 | 1.065 | 89 |
| Example 4 | 1040 | 270 | 680 | 85 | 48 | 1.360 | 45 |
| Example 5 | 590 | 320 | 440 | 67 | 38 | 1.042 | 59 |
| Example 6 | 750 | 70 | 670 | 77 | 36 | 1.054 | 40 |
| Example 7 | 1650 | 110 | 1580 | 92 | 286 | 1.090 | 58 |
| Example 8 | 1380 | 120 | 1290 | 92 | 189 | 1.110 | 49 |
| Example 9 | 1600 | 120 | 1280 | 72 | 190 | 1.059 | 40 |
| Example 10 | 1490 | 90 | 1440 | 86 | 172 | 1.006 | 59 |
| Example 11 | 1450 | 80 | 1440 | 80 | 85 | 0.957 | 61 |
| Example 12 | 1500 | 90 | 1470 | 90 | 264 | 1.050 | 51 |
| Example 13 | 1400 | 120 | 1290 | 92 | 189 | 1.110 | 48 |
| Santoprene ™ Grades | | | | | | | |
| Santoprene 101-80A | 1120 | 200 | 960 | 84 | 115 | 0.960 | 28 |
| Santoprene 101-73 | 820 | 120 | 710 | 77 | 76 | 0.971 | 40 |
| Santoprene 101-75 | 830 | 210 | 630 | 80 | 67 | 0.968 | 29 |
| Santoprene 101-64 | 680 | 90 | 600 | 61 | 55 | 0.914 | 56 |

The results provided in the table show that using the "dynamic de-vulcanization" process of the present invention, it is now possible to produce thermoplastic rubbers from rubber scrap materials having a wide range of flexural modulus levels with a similar Shore A hardness. This is accomplished by varying the composition of the scrap materials and virgin compounds along with suitable plasticizers. Further, the tensile strength of the thermoplastic rubbers produced by the "dynamic de-vulcanization" process of the present invention generally is greater than the Santoprene™ rubbers at comparable flexural modulus levels. Equally significant, the cost of producing thermoplastic rubbers using recycled scrap materials is lower than the typical cost of producing conventional thermoplastic rubbers.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A process for the manufacture of thermoplastic rubber from a vulcanized rubber scrap material comprising milling said vulcanized rubber scrap material with an epoxidized natural rubber and stearic acid or a zinc salt thereof to form a base mixture and blending said base mixture with an olefinic plastic resin in the presence of devulcanizing additives in order to devulcanize said vulcanized rubber scrap material and form said thermoplastic rubber.

2. The process in accordance with claim 1, wherein said devulcanizing additives are selected from the group consisting of zinc oxide, ethylene vinyl acetate copolymer, at least one rubber accelerator, and mixtures thereof.

3. The process in accordance with claims 2, wherein said at least one rubber accelerator is selected from the group consisting of dibenzothiozole disulphide and diphenyl guanidine.

4. The process in accordance with claim 1, wherein a plasticizer is added during the milling of said vulcanized rubber scrap material.

5. The process in accordance with claim 1, wherein a virgin rubber is added during the milling of said vulcanized rubber scrap material.

6. A process for manufacture of thermoplastic rubber comprising devulcanizing a vulcanized rubber scrap material while blending with an olefinic plastic resin comprising the steps of:

(a) milling together from about 50 to about 100 parts of a vulcanized rubber scrap material with from about 2.0 to about 7.5 parts of an epoxidized natural rubber and from about 1.0 to about 6.0 parts of stearic acid or salt thereof to form a base mixture; and (b) blending from about 50 to about 85 parts of said base mixture with from about 50 to about 15 parts of an olefinic plastic resin, from about 1.0 to about 5.0 parts of zinc oxide, from about 0.2 to about 2.0 parts of at least one rubber accelerator, and from about 1.0 to about 8.0 parts of an ethylene vinyl acetate copolymer to form a thermoplastic rubber.

7. The process in accordance with claim 6, wherein said at least one rubber accelerator is selected from the group consisting of dibenzothiozole disulphide and diphenyl guanidine.

8. The process in accordance with claim 6, wherein said at least one rubber accelerator is from about 0.2 to about 1.0 parts dibenzothiozole disulphide and from about 0.2 to about 1.0 parts diphenyl guanidine.

9. The process in accordance with claim 6, wherein said blending is conducted in an internal mixer having a starting temperature of about 200 to about 250° F. and wherein said blending is continued for about 1.0 to about 2.0 minutes after the temperature of the mixture reaches about 350° F.

10. The process in accordance with claim 9, wherein said blending of the mixture is conducted at about 50 to about 80 rpm until the temperature of the mixture reaches about 350° F. and then is reduced to about 30 rpm for about 1.0 to about 2.0 minutes.

11. The process in accordance with claim 6, wherein said vulcanized rubber scrap material is derived from rubbers selected from the group consisting of natural rubber, ethylene propylene terpolymer, EPDM rubber (ethylene-propylene diene polymer), EPR copolymer, styrene butadiene rubber and nitrile rubber and mixtures thereof.

12. The process in accordance with claim 6, wherein said vulcanized rubber scrap material is selected from the group consisting of EPDM roofing membrane, EPDM automobile scraps, EPDM automobile window and windscreen seals scraps, natural rubber truck tire retread scrap, passenger tire crumb and natural rubber latex glove scraps and mixtures thereof.

13. The process in accordance with claim 6, wherein said olefinic plastic resin is selected from the group consisting of propylene homopolymer and copolymers, ethylene homopolymer and copolymers, high density polyethylene, low density polyethylene and mixtures thereof, said olefinic plastic resin being a virgin resin, a recycled resin or a mixture thereof.

14. The process in accordance with claim 6, wherein virgin rubber compound is added to the milling step.

15. The process in accordance with claim 6, wherein a plasticizer is added to the milling step.

16. The process in accordance with claims 6, wherein said vulcanized rubber scrap material is an EPDM rubber scrap material and said olefinic plastic resin is a polypropylene copolymer.

17. The process in accordance with claim 16, wherein said olefinic plastic resin is selected from the group consisting of virgin polypropylene, recycled polypropylene and mixtures thereof.

* * * * *